UNITED STATES PATENT OFFICE.

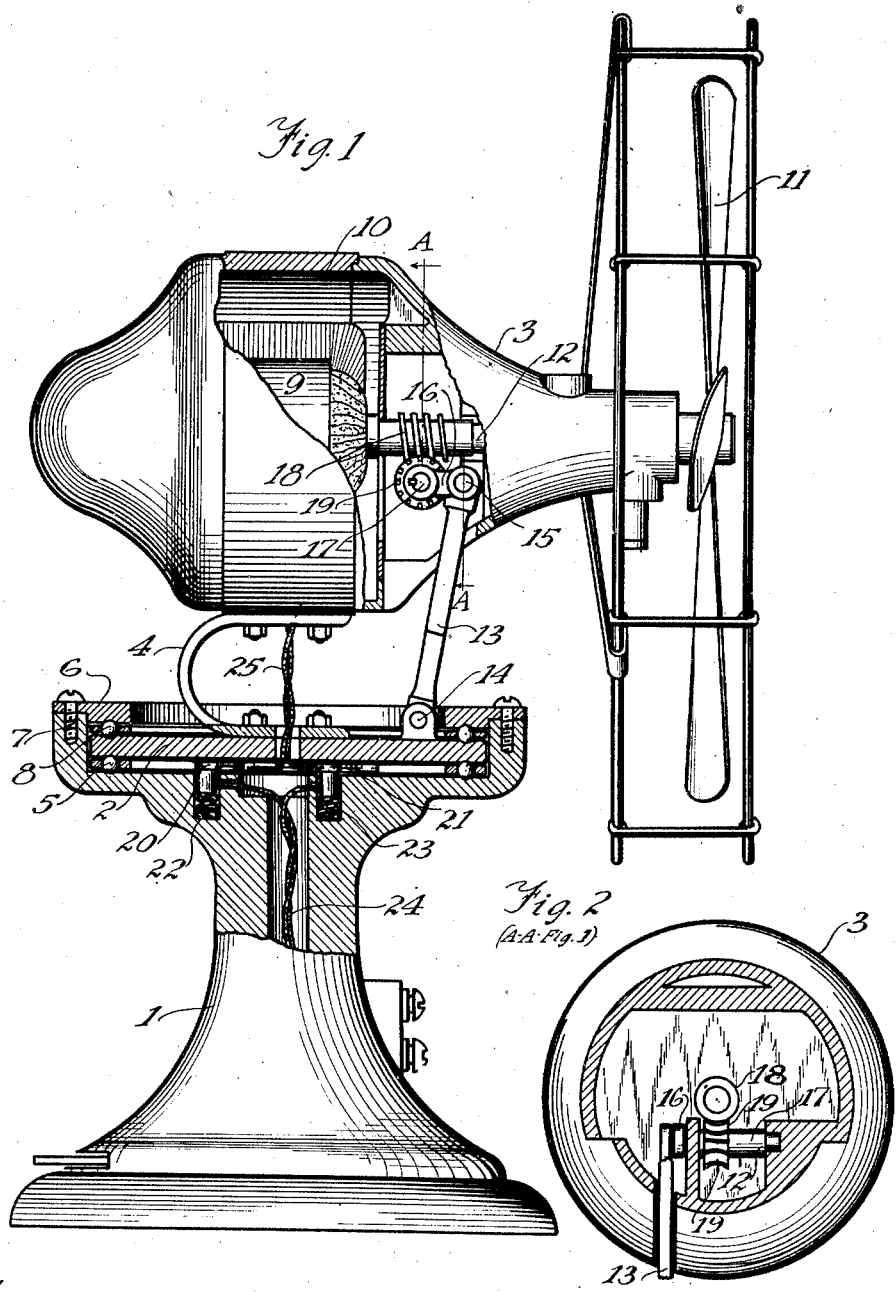

WILLARD M. McEWEN, OF CHICAGO, ILLINOIS.

OSCILLATING FAN.

1,334,958.  Specification of Letters Patent.  Patented Mar. 30, 1920.

Application filed May 1, 1916. Serial No. 94,691.

*To all whom it may concern:*

Be it known that I, WILLARD M. McEWEN, a citizen of the United States of America, and a resident of Chicago, county of Cook, and State of Illinois, have invented certain new and useful Improvements in Oscillating Fans, of which the following is a specification.

The main objects of this invention are to provide an improved form of oscillating fan similar to that shown in my copending application, Serial No. 29,129, filed May 19, 1915; to provide improved means for tilting the fan mechanism transversely to the plane of oscillation; to provide improved means for rotatably supporting the fan mechanism; and to provide improved means for tiltably supporting the fan mechanism on said rotatable means.

An illustrative embodiment of this invention is shown in the accompanying drawings, in which:

Figure 1 is a side elevation, partly sectional, of the improved electric fan.

Fig. 2 is a sectional detail taken on the line A—A of Fig. 1.

In the construction shown in the drawings, the supporting member or base 1 has a member or disk 2 rotatably mounted thereon, upon which the blower mechanism 3 is tiltably mounted by means of a spring member 4.

The member 2 is supported on the base 1 by means of roller bearings 5 and is retained against displacement by means of a ring 6 secured to the base 1 by means of screws 7. A roller bearing 8 is also interposed between the member 2 and ring 6 so as to take the upward strain at one side of the disk when the blower mechanism is being tilted toward the extreme position at the opposite side of the disk.

The blower mechanism 3 comprises the usual motor 9 journaled in a housing 10 and connected to rotate the fan 11 which is mounted on the end of the motor shaft 12. The spring 4 which tiltably supports the blower mechanism 3 on the member 2 is preferably a flat bar bent to substantially U-shape, and is rigidly secured to both the motor casing 10 and the member 2. This spring allows the mechanism to tilt as freely as if it were pivoted to the member 2, but at the same time maintains a tension on the connection between the mechanism and the member that prevents lost motion.

The mechanism for tilting the blower mechanism comprises a pitman or link 13 pivotally connected at 14 to the member 2, and at 15 to a crank 16. The crank 16 is journaled on a shaft 17 which is disposed horizontally at right angles to the motor shaft 12 and is geared thereto by means of a worm 18 and gear 19.

The electrical connection between the motor 9 and a rheostat (not shown) in the base 1, may be conveniently made by means of collector rings 20 and 21 secured to the member 2 and spring actuated brushes 22 and 23 mounted in the base 1. Wires 24 lead from the rheostat (not shown) to the brushes 22 and 23, and wires 25 lead from collector rings 20 and 21 to the motor.

The present device employs the same principle of oscillation as that explained in the hereinbefore mentioned copending application, wherein by tilting the axis of rotation of the fan in a vertical plane, gyratory forces are brought into action which cause the fan to shift back and forth in a horizontal plane. The tilting is effected by the action of the pitman 13 as the crank 16 is rotated by the worm 18 and gear 19. Since the member 2 is freely journaled on the base 1, the fan is permitted to swing horizontally in either direction. By the action of the gyratory forces referred to, the direction of horizontal swinging is reversed whenever the vertical tilting is reversed, and the length of the swing depends upon the rapidity with which the change in direction of the tilting occurs.

Although but one specific embodiment of this invention has been herein shown and described, it will be understood that numerous details of the construction shown may be altered or omitted without departing from the spirit of this invention as defined by the following claims.

I claim:

1. The combination of a support, a member rotatably mounted on said support, motor driven mechanism, a flat spring bent to U-shape and tiltably supporting said motor driven mechanism on said member, and means carried by said motor driven mechanism and operated by the motor and coacting with said member to tilt said motor driven mechanism with respect to said support.

2. The combination of a support, a disk rotatably mounted thereon, motor driven mechanism, a flat spring of U-shaped form tiltably supporting said motor driven mechanism on said disk, and a pitman connecting said motor driven mechanism and said disk whereby the operation of said motor driven mechanism causes it to be tilted so that gyratory forces are set up which cause the oscillation of said disk with respect to said support.

Signed at Chicago this 29th day of April, 1916.

WILLARD M. McEWEN.